(12) United States Patent
Watanabe (10) Patent No.: US 12,140,943 B2
(45) Date of Patent: Nov. 12, 2024

(54) REMOTE TRAVELING VEHICLE, REMOTE TRAVELING SYSTEM, AND MEANDER TRAVELING SUPPRESSION METHOD

(71) Applicant: TOYOTA JIDOSHA KABUSHIKI KAISHA, Toyota (JP)

(72) Inventor: Toshinobu Watanabe, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 208 days.

(21) Appl. No.: 17/832,046

(22) Filed: Jun. 3, 2022

(65) Prior Publication Data

US 2022/0390937 A1 Dec. 8, 2022

(30) Foreign Application Priority Data

Jun. 7, 2021 (JP) ................................. 2021-095275

(51) Int. Cl.
| | |
|---|---|
| *G05D 1/00* | (2024.01) |
| *B60W 50/06* | (2006.01) |
| *B60W 60/00* | (2020.01) |
| *A01B 69/00* | (2006.01) |

(52) U.S. Cl.
CPC ........... *G05D 1/0011* (2013.01); *B60W 50/06* (2013.01); *B60W 60/001* (2020.02); *B60W 2556/45* (2020.02); *B60W 2710/20* (2013.01); *B60W 2720/10* (2013.01)

(58) Field of Classification Search
CPC ............. G05D 1/00; G05D 1/02; A01B 69/00
See application file for complete search history.

(56) References Cited

U.S. PATENT DOCUMENTS

| | | | | |
|---|---|---|---|---|
| 2013/0261846 | A1* | 10/2013 | Mcquade | ............... F02D 41/26 701/1 |
| 2017/0255195 | A1 | 9/2017 | Mabuchi | |
| 2017/0293295 | A1* | 10/2017 | Tani | ...................... A01B 69/00 |
| 2017/0351926 | A1* | 12/2017 | Nagase | ............. B60W 60/0016 |
| 2019/0146485 | A1* | 5/2019 | Yoneda | ............... B60W 30/146 701/2 |
| 2023/0092167 | A1* | 3/2023 | Oba | ...................... B60W 40/04 701/23 |
| 2023/0182759 | A1* | 6/2023 | Wright | ............. B60W 60/0053 701/24 |

FOREIGN PATENT DOCUMENTS

| | | |
|---|---|---|
| JP | 2016-071585 A | 5/2016 |
| JP | 2017-158149 A | 9/2017 |
| JP | 2019-012514 A | 1/2019 |

\* cited by examiner

*Primary Examiner* — Tan Q Nguyen (74) *Attorney, Agent, or Firm* — Sughrue Mion, PLLC (57) ABSTRACT

A remote traveling vehicle remotely operated by a remote operator receives remote control information of the remote operator from a server via a communication network. The remote traveling vehicle acquires driving environment information of the remote traveling vehicle, and acquires meandering state information including whether a meandering state of the remote traveling vehicle is detected, based on the driving environment information. When the remote-control information includes detection of the meandering condition of the remote traveling vehicle, the remote traveling vehicle adds a limit on the upper speed limit or limit steering angle of the remote traveling vehicle.

10 Claims, 10 Drawing Sheets

REMOTE TRAVELING VEHICLE, REMOTE TRAVELING SYSTEM, AND MEANDER TRAVELING SUPPRESSION METHOD

CROSS-REFERENCE TO RELATED APPLICATION

The present application claims priority under 35 U.S.C. § 119 to Japanese Patent Application No. 2021-095275, filed Jun. 7, 2021, the contents of which application are incorporated herein by reference in their entirety.

BACKGROUND

Field

The present disclosure relates to a remote traveling vehicle, a remote traveling system, and a meander traveling suppression method.

Background Art

JP2016-071585A discloses a technique related to remote control of autonomous driving vehicles. According to this technique, when the delay time of the wireless communication becomes equal to or greater than the threshold value, the traveling control of the vehicle is changed from the normal control to the safety control.

SUMMARY

However, in the remote traveling service in which the vehicle is operated at a remote place, a delay occurs in the communication of the remote operation information from the remote monitoring server to the vehicle. Therefore, it is hard to evaluate the remote-control information of the vehicle and the actual vehicle motion in simultaneous series. Therefore, in the remote traveling service, a countermeasure is required in the case where meandering of the vehicle occurs due to the communication delay.

The present disclosure has been made in view of the above problems, when the remote traveling of the autonomous traveling vehicle is performed, and an object thereof is to provide a technique capable of suppressing meander traveling of the autonomous traveling vehicle due to communication delay.

A first disclosure is applied to a remote traveling vehicle operated remotely by a remote operator in order to achieve the above object. The remote traveling vehicle includes at least one memory storing at least one program, and at least one processor coupled with the at least one memory. The at least one program is configured to cause the at least one processor to execute receiving remote control information of a remote operator from a server via a communication network, acquiring driving environment information of the remote traveling vehicle, acquiring meandering state information including whether a meandering state of the remote traveling vehicle is detected, based on the driving environment information, and adding an adjustment for preventing a meandering state to motion control amount calculated from the remote operation information or the remote operation information, when the meandering state information includes detection of a meandering state of the remote traveling vehicle.

The second disclosure has the following features in the first disclosure.

The driving environment information includes vehicle behavior information relating to vehicle behavior of the remote traveling vehicle.

The third disclosure has the following features in the first disclosure.

When the meandering state is detected, the adding the adjustment includes executing an upper speed limit setting processing for setting an upper speed limit of the vehicle speed to a small value than before the meandering state is detected, and executing an adjustment processing for adjusting the remote control information or the motion control amount such that the vehicle speed does not exceed the upper speed limit.

The fourth disclosure has the following features in the third disclosure.

The upper speed limit setting processing is configured to set such that the upper speed limit gradually decreases from a first upper speed limit toward a second upper speed limit.

The fifth disclosure has the following features in the third disclosure.

When the meandering state is detected, the adding the adjustment includes acquiring whether a following vehicle of the remote traveling vehicle is detected, and when the following vehicle is detected, holding execution of the upper speed limit setting processing.

The sixth disclosure has the following features in the fourth disclosure.

When the meandering state is detected, the adding the adjustment includes acquiring whether a following vehicle of the remote traveling vehicle is detected, and when the following vehicle is detected, in the upper speed limit setting processing, setting a time constant for changing the upper speed limit from the first upper speed limit to the second upper speed limit to a large value than when the following vehicle is not detected.

The seventh disclosure has the following features in the first disclosure.

When the meandering state is detected, the adding the adjustment includes, executing a limit steering angle setting processing for setting a limit steering angle of a vehicle steering angle to a small value than before the meandering state is detected, and executing an adjustment processing for adjusting the remote control information or the motion control amount such that the vehicle steering angle does not exceed the limit steering angle.

The eighth disclosure has the following features in the seventh disclosure.

The limit steering angle setting processing is configured to set such that the limit steering angle gradually decreases from a first limit steering angle toward a second limit steering angle.

The ninth disclosure has the following features in the seventh disclosure.

When the meandering state is detected, the adding the adjustment includes, acquiring whether a following vehicle of the remote traveling vehicle is detected, and when the following vehicle is detected, holding execution of the limit steering angle setting processing.

The tenth disclosure has the following features in the eighth disclosure.

When the meandering state is detected, the adding the adjustment includes, acquiring whether a following vehicle of the remote traveling vehicle is detected, and when the following vehicle is detected, in the limit steering angle setting processing, setting a time constant for changing the limit steering angle from the first limit steering angle to the second limit steering angle to a large value than when the following vehicle is not detected.

The eleventh disclosure applies to a remote traveling system including a remote traveling vehicle, and a server for performing remote traveling of the remote traveling vehicle in order to achieve the above object. The server is configured to execute acquiring remote control information by a remote operator who drives the remote-control vehicle, and transmitting the remote-control information to the remote traveling vehicle over a communication network. The remote traveling vehicle includes at least one memory storing at least one program, and at least one processor coupled with the at least one memory. The at least one program is configured to cause the at least one processor to execute receiving the remote control information from the server via the communication network, acquiring driving environment information of the remote traveling vehicle, acquiring meandering state information including whether a meandering state of the remote traveling vehicle is detected, based on the driving environment information, and adding an adjustment for preventing a meandering state to motion control amount calculated from the remote operation information or the remote operation information, when the meandering state information includes detection of a meandering state of the remote traveling vehicle.

The twelfth disclosure, in order to achieve the above object, is applied to a meander traveling suppression method for a computer to cause a remote traveling vehicle that remotely operates by a remote operator to suppress the meander traveling of the remote traveling vehicle. The computer is configured to execute receiving remote control information of a remote operator, acquiring driving environment information of the remote traveling vehicle, acquiring meandering state information including whether a meandering state of the remote traveling vehicle is detected, based on the driving environment information, and adding an adjustment for preventing a meandering state to motion control amount calculated from the remote operation information or the remote operation information, when the meandering state information includes detection of a meandering state of the remote traveling vehicle.

The thirteenth disclosure is applied to a meander traveling suppressing program causing computer to cause a remote traveling vehicle that remotely operates by a remote operator to suppress the meander traveling of the remote traveling vehicle in order to achieve the above object. The meander traveling suppressing program is configured to cause the computer to execute receiving remote control information of a remote operator from a server via a communication network, acquiring driving environment information of the remote traveling vehicle, acquiring meandering state information including whether a meandering state of the remote traveling vehicle is detected, based on the driving environment information, and adding an adjustment for preventing a meandering state to motion control amount calculated from the remote operation information or the remote operation information, when the meandering state information includes detection of a meandering state of the remote traveling vehicle.

According to the technique of the present disclosure, when a meandering state of a remote traveling vehicle remotely operated by a remote operator is detected, an adjustment for preventing the meandering state is added to the remote-control information or the motion control amount calculated from the remote-control information. Thus, it is possible to suppress the meander traveling of the autonomous traveling vehicle caused by the communication delay.

DETAILED DESCRIPTION

Hereinafter, an embodiment of the present disclosure will be described with reference to the accompanying drawings. However, it is to be understood that even when the number, quantity, amount, range or other numerical attribute of each element is mentioned in the following description of the embodiment, the present disclosure is not limited to the mentioned numerical attribute unless explicitly described otherwise, or unless the present disclosure is explicitly specified by the numerical attribute theoretically.

1. Schematic Configuration of Remote Traveling System

Figure 1:
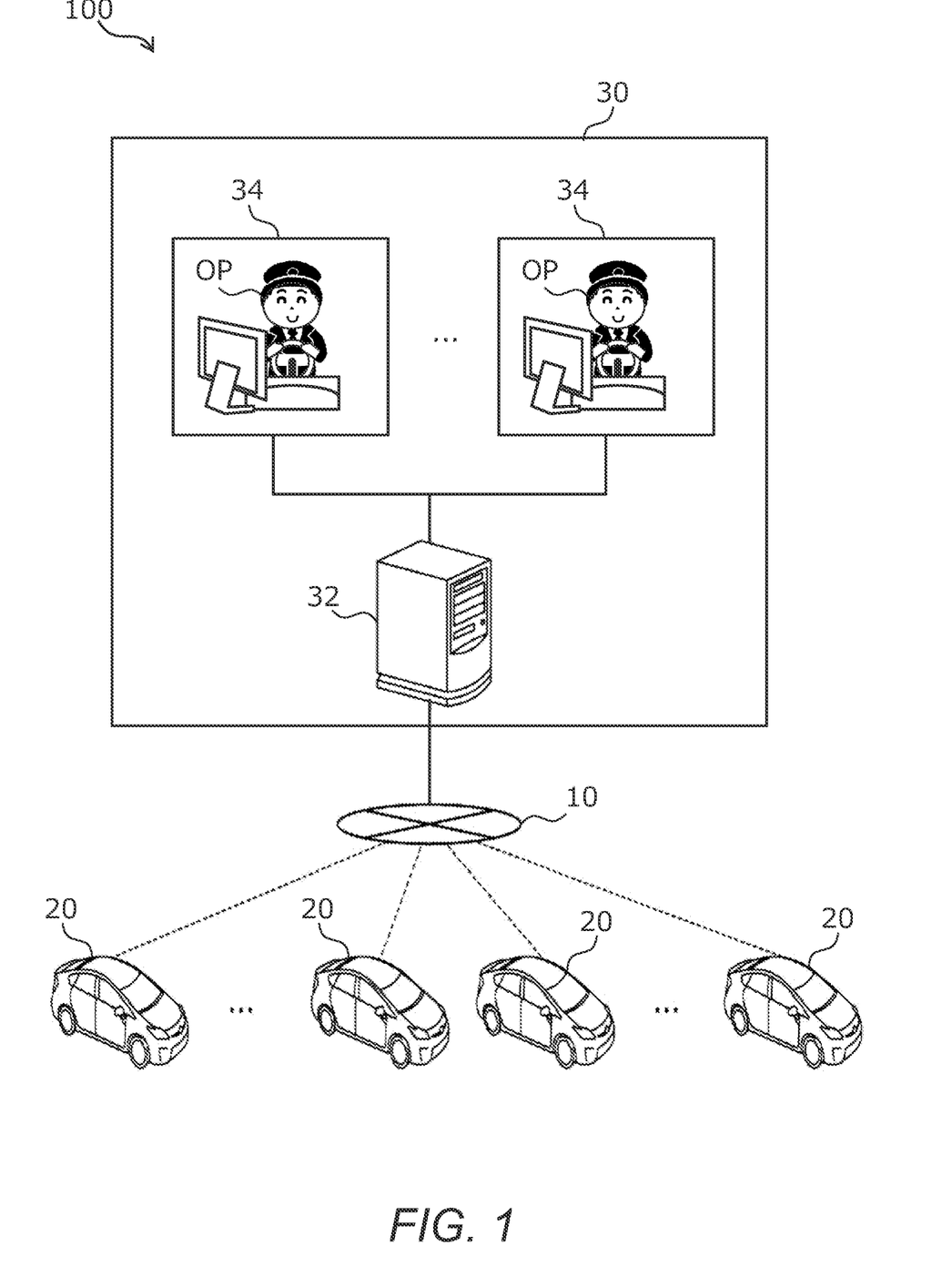
FIG. 1 is a diagram schematically showing a configuration of a remote traveling system.

FIG. 1 is a diagram schematically showing a configuration of a remote traveling system common to all embodiments described later. A remote traveling system 100 is a system for remotely operating an autonomous traveling vehicle 20 from a remote operation center 30. As the autonomous traveling level of the autonomous traveling vehicle 20, for example, level 4 or level 5 in the level definition of SAE (Society of Automotive Engineers) is assumed. Hereinafter, the autonomous traveling vehicle 20 capable of remote traveling is referred to as "remote traveling vehicle 20" or simply "vehicle 20".

The remote traveling is performed by a remote operator OP when the vehicle 20 becomes difficult or is expected to become difficult to continue autonomous traveling.

In the remote traveling, the remote operator OP operates the vehicle 20, in detail, at least part of the steering operation or the acceleration/deceleration operation. In the remote traveling, the cognition, judgement, and operation necessary for traveling are conducted by the remote operator OP. The remote operator OP operates the vehicle 20 in the same manner as it does at the driver's seat of the vehicle 20 from a remote location. However, in the remote traveling, it is not always necessary for the remote operator OP to perform all the cognition, judgment, and operation. At least some of the cognition, determination, and manipulation may be assisted by the functionality of the vehicle 20.

A server 32 and a remote operation terminal 34 are installed in the remote operation center 30. The vehicles 20 are connected to servers 32 via a communication network 10 including 4G or 5G. The number of vehicles 20 that can communicate with the server 32 is one or more.

The remote operation terminal 34 is an operating terminal for remote traveling operated by the remote operator OP. At least one and preferably multiple remote operation terminals 34 are provided. The remote operation center 30 is provided with a number of remote operators OP corresponding to the number of the remote operation terminals 34.

Each remote operation terminal 34 is connected to the server 32 via a communication network including a LAN or an Internet. The remote operation center 30 does not necessarily have to be an existing facility. Here, a system including the remote operation terminal 34 connected to the server 32 by a communication network is referred to as the "remote operation center 30". Thus, the server 32 may be installed on a cloud, and the remote operation terminal 34 may be installed in a satellite office in each location or at home of remote operators.

Figure 2:
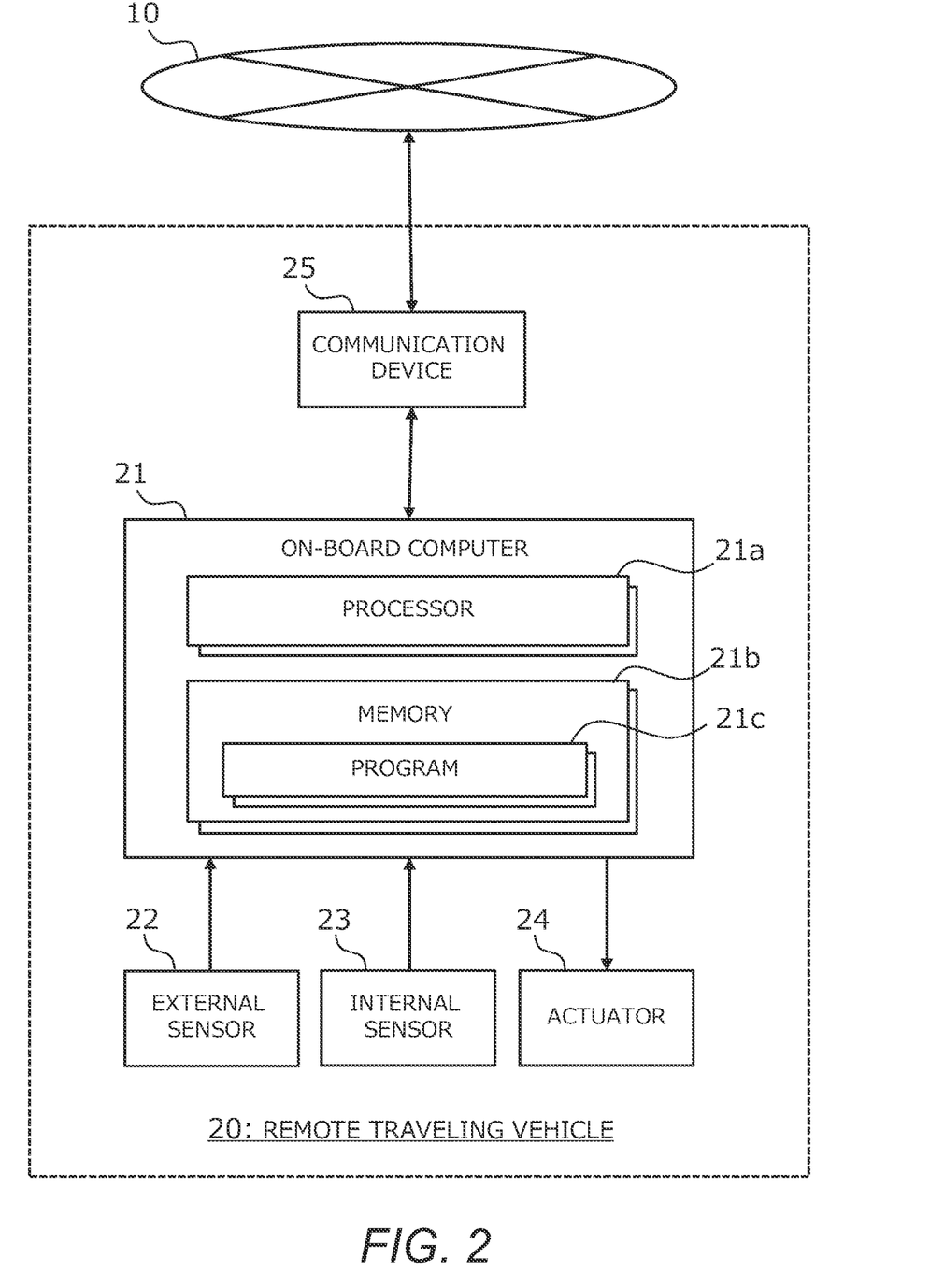
FIG. 2 is a block diagram showing an example of a configuration of an autonomous traveling vehicle.

FIG. 2 is a block diagram showing an example of a configuration of the vehicle 20. The vehicle 20 includes an on-board computer 21. The on-board computer 21 is an assembly of a plurality of ECUs (Electronic Control Unit) mounted on the vehicle 20. The vehicle 20 also includes an external sensor 22, an internal sensor 23, an actuator 24, and a communication device 25. These are connected to the on-board computer 21 using in-vehicle networks such as CAN (Controller Area Network).

The on-board computer 21 includes one or more processors 21a (hereinafter, simply referred to as a processor 21a) and one or more memories 21b (hereinafter, simply referred to as a memory 21b) coupled to the processor 21a. The memory 21b stores one or more programs 21c (hereinafter, simply referred to as a program 21c) executable by the processor 21a and various related information.

When the processor 21a executes the program 21c, various kinds of processing performed by the processor 21a are realized. The program 21c includes, for example, a program for realizing autonomous traveling, and a program for realizing remote traveling. Further, the program 21c includes a meander traveling suppression program for causing the on-board computer 21 to function as a device for suppressing meander traveling, which will be described later. The memory 21b includes a main storage device and an auxiliary storage device. The program 21c may be stored in a main storage device or may be stored in a computer-readable storage medium that includes the auxiliary storage device. The auxiliary storage device may store a map database for managing map information for autonomous traveling.

The external sensor 22 includes a camera for photographing surroundings of the vehicle 20, particularly in front of the vehicle 20. The camera may be a monocular camera or a stereo camera. A plurality of cameras may be provided in the vehicle 20, and may photograph side and rear of the vehicle 20. Further, the camera may be shared between autonomous traveling and remote control, the camera for autonomous traveling and the camera for remote control may be provided separately.

The external sensor 22 includes a perception sensor in addition to the camera. The perception sensor is a sensor that acquires information for perceiving surrounding conditions of the vehicle 20. Examples of perception sensors other than the camera include a LiDAR (Laser Imaging Detection and Ranging) and a millimeter-wave radar. The external sensor 22 also includes a location sensor for detecting the location and orientation of the vehicle 20. As the location sensor, a Global Positioning System (GPS) sensor is exemplified. Information acquired by the external sensor 22 is transmitted to the on-board computer 21.

The internal sensor 23 includes a state sensor that acquires information about the motion of the vehicle 20. As the state sensor, for example, a wheel speed sensor, an acceleration sensor, an angular velocity sensor, and a steering angle sensor are exemplified. The acceleration sensor and the angular velocity sensor may constitute an IMU. Information acquired by the internal sensor 23 is transmitted to the on-board computer 21. Hereinafter, the information acquired by the internal sensor 23 is referred to as "internal information INT", and the information acquired by the external sensor 22 is referred to as "external information EXT". The internal information INT and the external information EXT are stored in the memory 21b of the on-board computer 21 as driving environment information DINF indicating a driving environment of the vehicle 20.

The actuator 24 includes a steering system for steering the vehicle 20, a driving system for driving the vehicle 20, and a braking system for braking the vehicle 20. The steering systems include, for example, a power steering system, a steer-by-wire steering system, and a rear wheel steering system. The drive includes, for example, an engine system, an EV system, and a hybrid system. The braking system includes, for example, a hydraulic braking system and a power regenerative braking system. The actuator 24 operates by a control signal transmitted from the on-board computer 21.

The communication device 25 is a device for controlling wireless communication with the outside of the vehicle 20. The communication device 25 communicates with the server 32 via the communication network 10. Information processed by the on-board computer 21 is transmitted to the server 32 using the communication device 25. Information processed by the server 32 is captured by the on-board computer 21 using the communication device 25. Also, if vehicle-to-vehicle communication with other vehicles or road-to-vehicle communication with infrastructure facilities is required for autonomous traveling, communication with those external devices is also performed by the communication device 25.

Figure 3:
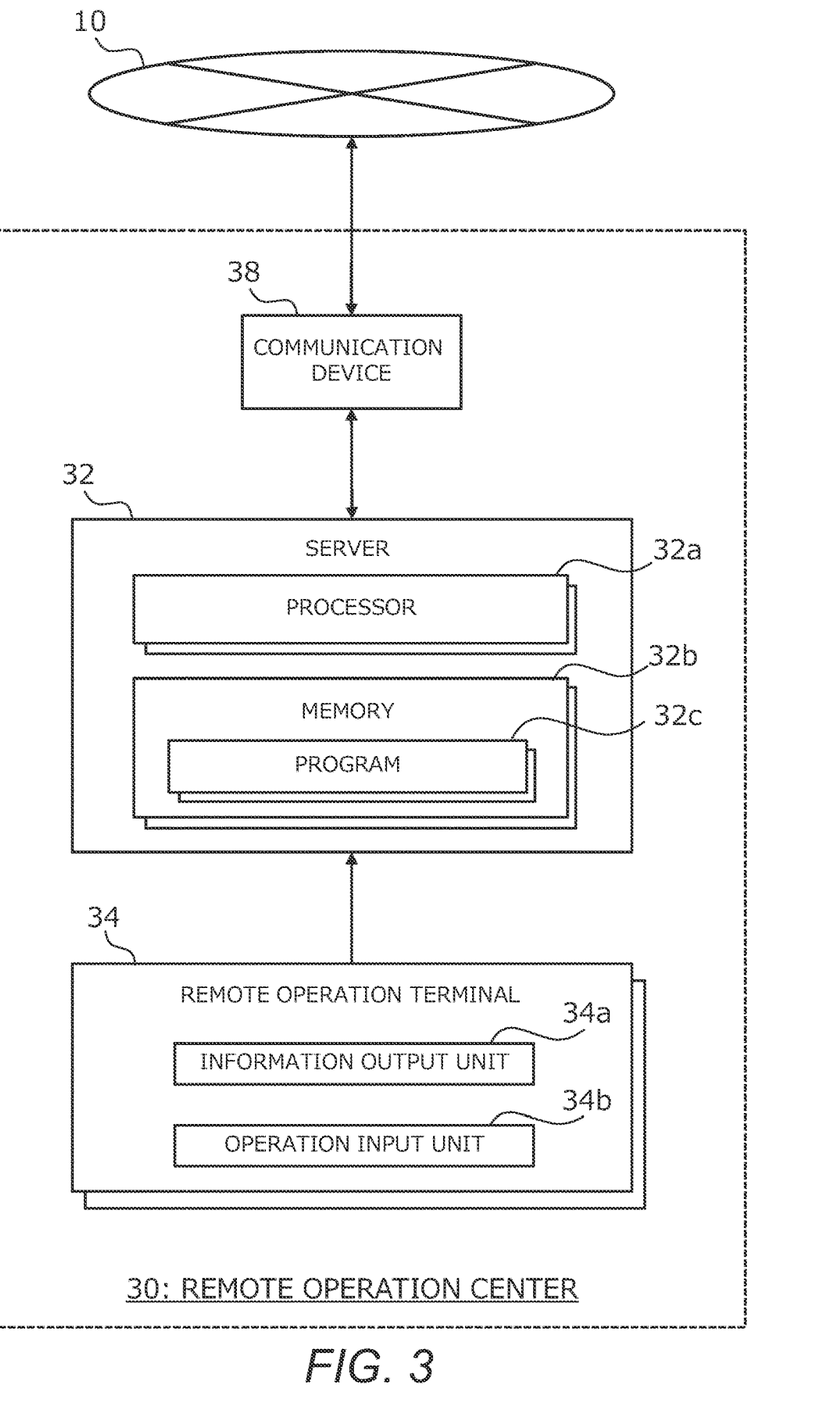
FIG. 3 is a block diagram showing an example of a configuration of a remote operation center.

FIG. 3 is a block diagram showing an example of a configuration of the remote operation center 30. The remote operation center 30 includes a server 32. The server 32 may be a computer or a set of computers connected by a communication network. The remote operation center 30 includes a remote operation terminal 34 and a communication device 38. These are connected to the server 32 using the communication network. As described above, one or more remote operation terminal 34 may be connected to the server 32.

The server 32 includes one or more processors 32a (hereinafter simply referred to as a processor 32a) and one or more memories 32b (hereinafter simply referred to as a memory 32b) coupled to the processor 32a. The memory 32b stores one or more programs 32c (hereinafter, simply referred to as a program 32c) executable by the processor 32a and various related information.

When the processor 32a executes the program 32c, various kinds of processing performed by the processor 32a are realized. The program 32c includes, for example, a program for realizing remote traveling. Memory 32b includes a main storage device and an auxiliary storage device. The program 32c may be stored in a main storage device or may be stored in a computer-readable storage medium that includes the auxiliary storage device. The auxiliary storage device may store a map database for managing map information for autonomous traveling. The map database may be stored in at least one of the server 32 and the on-board computer 21.

The remote operation terminal 34 includes an information output unit 34a. The information output unit 34a is a device for outputting information necessary for remote traveling of the vehicle 20 to the remote operator OP. The information output unit 34a includes a display for outputting an image. On the display, for example, an image in front of the vehicle 20 photographed by the camera of the vehicle 20 is displayed. As the display method, for example, the same scene as when looking forward from the driver's seat of the vehicle 20 may be displayed on the display. The display may have a plurality of display screens and may display images of the side and/or the rear of the vehicle 20.

The remote operation terminal 34 includes an operation input unit 34b. The operation input unit 34b is a device for inputting an operation for remote traveling from the remote operator OP. To simulate the operation required when the vehicle 20 is actually operated, the operation input unit 34b includes a steering wheel for steering operation, an accelerator pedal for accelerating operation, and a brake pedal for decelerating operation. If the vehicle 20 includes a transmission, the operation input unit 34b may also include a lever or switch of the transmission. In addition, other devices for inputting operations necessary for safe driving, such as operation levers for operating a direction indicator and a wiper of the vehicle 20, are provided in the operation input unit 34b.

The communication device 38 is a device for controlling communication with the outside of the remote operation center 30. The communication device 38 communicates with one or more vehicles 20 via the communication network 10. The information processed by the server 32 is transmitted to the vehicle 20 using the communication device 38. The information processed by the vehicle 20 is captured by the server 32 using the communication device 38.

When performing the remote traveling, the server 32 of the remote operation center 30 acquires remote control information RINF including the operation amount input from the operation input unit 34b operated by the remote operator OP. Specifically, the remote-control information RINF includes operation amount of the steering wheel, accelerator pedal, and brake pedal. The remote-control information RINF is transmitted to the vehicle 20 via the communication network 10. The on-board computer 21 of the vehicle 20 operates the actuator 24 of the vehicle 20 based on the remote-control information RINF.

Here, there is a delay in communication through the communication network 10. For this reason, when a delay occurs in communication when the remote-control information RINF is transmitted from the server 32 of the remote operation center 30 to the on-board computer 21 of the vehicle 20, the remote-control information RINF and the actual behavior of the vehicle 20 cannot be evaluated in a simultaneous sequence. In this case, the behavior of the vehicle 20 during remote traveling may become unstable, and meander traveling, in which the vehicle 20 may meander to the left and right, may occur.

In the remote traveling system 100 according to the present embodiment has a feature in the control for suppressing meander traveling during remote traveling. Hereinafter, a meander traveling suppression method during remote traveling will be described in more detail.

2. Meander Traveling Suppression Method According to First Embodiment

Figure 4:
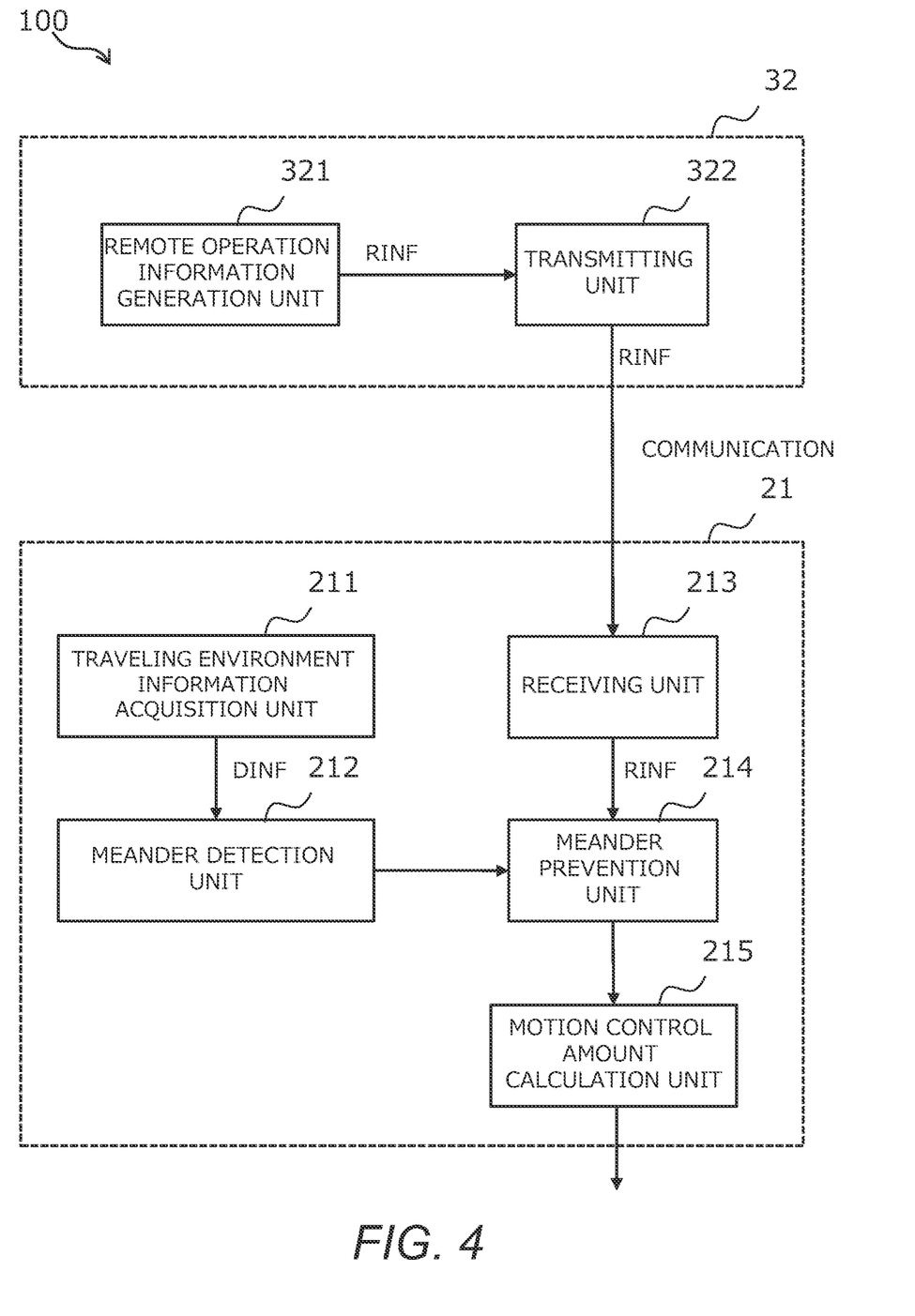
FIG. 4 is a block diagram showing a configuration of a remote traveling system according to a first embodiment of the present disclosure.

The meander traveling suppression method in the remote traveling can be realized by the remote traveling system 100 according to the first embodiment having the configuration shown in FIG. 4. In FIG. 4, each of the functions of the on-board computer 21 and the functions of the server 32 is represented by blocks. Hereinafter, the remote traveling system 100 according to the first embodiment will be described, focusing on the functions of the on-board computer 21 and the server 32. However, the configuration and functions already described will be omitted or simplified.

The server 32 includes a remote operation information generation unit 321 and a transmitting unit 322. The remote operation information generation unit 321 and the transmitting unit 322 may be independent ECUs, or may be functions of one ECU.

When the remote traveling is performed, the remote operator OP operates the operation input unit 34b. The remote operation information generation unit 321 acquires the remote operation information RINF, which includes the operation amount of the operation input unit 34b operated by the remote operator OP. The acquired remote control information RINF is transmitted to the transmitting unit 322.

The transmitting unit 322 functions as a remote-side communication unit that transmits the remote-control information RINF to the on-board computer 21 of the autonomous traveling vehicle 20 using the communication device 38.

The on-board computer 21 includes a driving environment information acquisition unit 211, a meander detection unit 212, a receiving unit 213, a meander prevention unit 214, and a motion control amount calculation unit 215. These functions may be independent ECUs or functions of one ECU.

The driving environment information acquisition unit 211 functions as an information acquisition unit that acquires driving environment information DINF including the internal information INT and the external information EXT from the memory 21b. The traveling environment information acquisition unit 211 sends the acquired operation environment information DINF to the meander detection unit 212.

The meander detection unit 212 detects whether the vehicle 20 is in a meandering state during remote traveling, and outputs as meandering state information. In the following description, this processing is referred to as "meander detection processing". In the meander detection processing, the meander detection unit 212 uses the driving environment information DINF to detect whether the vehicle 20 is in the meandering state, which is represented by the behavior of the vehicle 20. Typically, the meander detection unit 212 recognizes a white line of a road based on the image in front of the vehicle 20 included in the internal information INT, the vehicle 20 detects the presence or absence of a meandering state depending on whether the vehicle 20 crosses the white line a predetermined number of times. Alternatively, the meander detection unit 212 detects the vehicle behavior based on vehicle behavior information included in the internal information INT or the external information EXT. The vehicle behavior here is exemplified by an angle or relative distance between the white line and the vehicle 20, lateral acceleration of the vehicle 20, lateral position of the vehicle 20, actual steering angle of the vehicle 20, and the like. The meander detection unit 212 determines whether the vehicle behavior includes a periodic movement representing a meandering using a known frequency analysis or machine learning technique, and detects the presence or absence of a meandering state depending on whether the periodic movements is included in the vehicle behavior. The presence or absence of the meandering state detected in the meander detection processing is sent to the meander prevention unit 214 as meandering state information at any time.

The receiving unit 213 functions as a vehicle-side communication unit that receives the remote-control information RINF transmitted from the remote operation center 30 by using the communication device 25. The received remote control information RINF is sent to the meander prevention unit 214.

Figure 5:
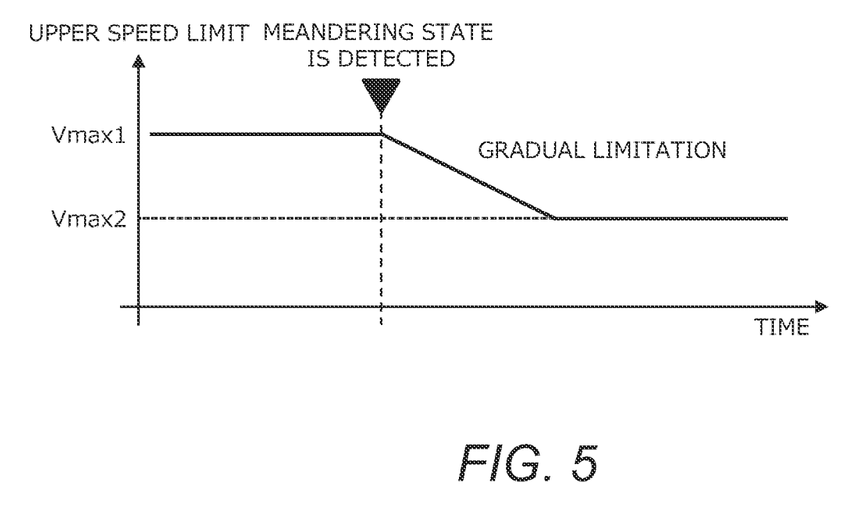
FIG. 5 is a diagram for explaining an example of a method of limiting an upper speed limit of the vehicle in the meander prevention processing according to the first embodiment of the present disclosure.

The meander prevention unit 214 executes a vehicle control processing for suppressing the meandering state of the vehicle 20 when the meandering state information indicating that the meandering state is detected in the meander detection processing is sent from the meander detection unit 212. In the following description, this processing is referred to as "meander prevention processing". In the meander preventing processing, the meander prevention unit 214 adds a limit for suppressing the meandering state of the vehicle 20 to the remote-control information RINF. FIG. 5 is a diagram for explaining an example of a method of limiting an upper speed limit of the vehicle in the meander prevention processing. In the example shown in FIG. 5, when the meandering state is detected, the meander prevention unit 214 sets the upper speed limit Vmax of the vehicle 20 to be smaller than before the meandering state was detected. This processing is hereinafter referred to as "upper speed limit setting processing". Typically, in the upper speed limit setting processing, the meander prevention unit 214 limits the upper speed limit Vmax from the first upper speed limit Vmax1 to the second upper speed limit Vmax2 (<Vmax1) when the meandering state is detected. The second upper speed limit Vmax2 here can be a preset value as the upper speed limit Vmax at which meandering operation of the vehicle 20 can be suppressed.

The meander prevention unit 214 adjusts the remote-control information RINF so that the vehicle speed of the vehicle 20 does not exceed the upper speed limit Vmax. This processing is hereinafter referred to as "adjustment processing". In the adjustment processing, the meander prevention unit 214 performs, for example, a guard processing, a raising processing, a gain adjustment processing, and the like on the operation amount of the accelerator pedal or the operation amount of the brake pedal included in the remote operation information RINF. Hereinafter, the remote-control information RINF after executing the meander prevention processing is referred to as "adjusted remote control information".

There is no limitation on the method of limiting the upper speed limit Vmax in the upper speed limit setting processing. However, since the rapid speed limitation is related to the safety of the following vehicle, the upper speed limit Vmax is gradually limited from the first upper speed limit Vmax1 to the second upper speed limit Vmax2 over a predetermined time in the embodiment shown in FIG. 5.

Figure 6:
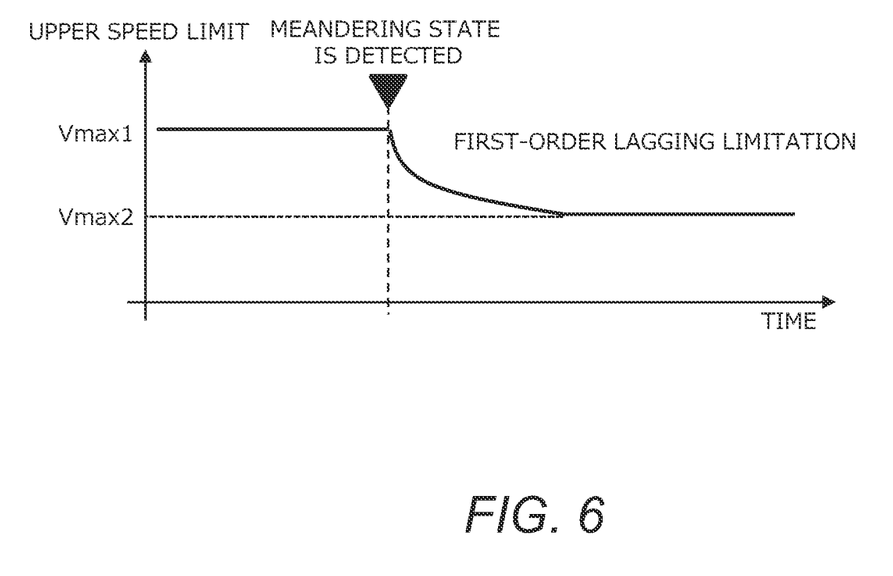
FIG. 6 is a diagram for explaining another example of the method of limiting the upper speed limit of the vehicle in the meander prevention processing according to the first embodiment of the present disclosure.

FIG. 6 is a diagram for explaining another example of the method of limiting the upper speed limit of the vehicle in the meander prevention processing. As shown in FIG. 6, the meander prevention unit 214 may limit the first upper speed limit Vmax1 of the vehicle 20 to decrease with a first order lag toward the second upper speed limit Vmax2(<Vmax1) when the meandering state of the vehicle 20 is detected.

Figure 7:
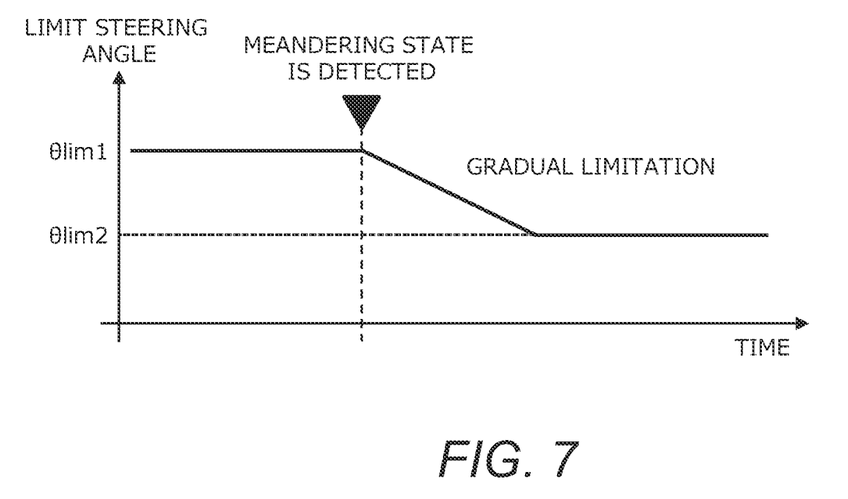
FIG. 7 is a diagram for explaining an example of a method of limiting a limit steering angle of the vehicle in the meander prevention processing according to the first embodiment of the present disclosure.

Alternatively, in the meander prevention processing, in place of the limit of the upper speed limit Vmax or in addition to the limit of the upper speed limit Vmax, the meander prevention unit 214 may limit a limit value (limit steering angle) of the steering angle of the vehicle 20. FIG. 7 is a diagram for explaining an example of a method for limiting a limit steering angle of the vehicle in the meander prevention processing. In the example shown in FIG. 7, when the meandering state is detected, the meander prevention unit 214 sets the limit steering angle θlim of the vehicle 20 to be smaller than before the meandering state is detected. This processing is hereinafter referred to as "limit steering angle setting processing". Typically, in the limit steering angle setting processing, when the meandering state is detected, the meander prevention unit 214 limits the limit steering angle θlim from the first limit steering angle θlim1 to the second limit steering angle θlim2 (<θlim1). The second limit steering angle θlim2 here can use a preset value as the limit steering angle θlim capable of suppressing the meander traveling of the vehicle 20. The meander prevention unit 214 performs a guard processing, a raising processing, a gain adjustment processing, or the like for the operating amount of the steering wheel included in the remote-control information RINF so that the vehicle steering angle of the vehicle 20 does not exceed the limit steering angle θlim in the adjustment processing.

Figure 8:
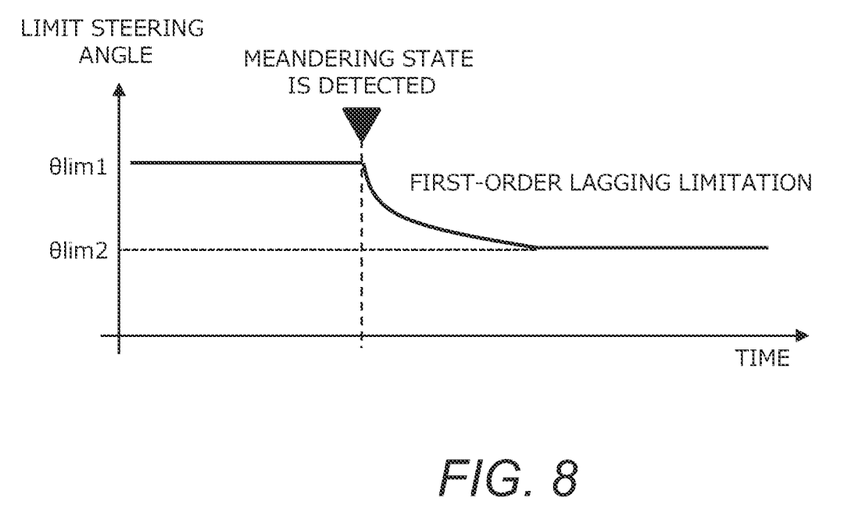
FIG. 8 is a diagram for explaining another example of the method of limiting the limit steering angle of the vehicle in the meander prevention processing according to the first embodiment of the present disclosure.

Similar to the upper speed limit Vmax, there is no limitation on the method of limiting the limit steering angle θlim in the limit steering angle setting processing. However, since the rapid steering angle limitation may affect the vehicle behavior, in the example shown in FIG. 7, the limit steering angle θlim of the steering angle is gradually limited so that the first limit steering angle θlim1 becomes the second limit steering angle θlim2 over a predetermined time. FIG. 8 is a diagram for explaining another example of a method for limiting the limit steering angle of the vehicle in the meander prevention processing. As shown in FIG. 8, the meander prevention unit 214 may adjust the time constant so that the first limit steering angle θlim1 of the vehicle 20 becomes smaller in a first order lag toward the second limit steering angle θlim2 (<θlim1) when the meandering state of the vehicle 20 is detected.

The adjusted remote-control information for which the meander prevention processing is executed in the meander prevention unit 214 is sent to the motion control amount calculation unit 215. In the motion control amount calculation unit 215, a momentum control amount of the vehicle 20 is generated based on the adjusted remote-control information. The motion control amount here is exemplified steering angle, acceleration, and deceleration of the vehicle 20. The on-board computer 21 operates the actuator 24 to realize the generated motion control amount.

According to the meander traveling suppression method during remote traveling as described above, it is possible to suppress the meander traveling of the vehicle 20 due to the communication delay. This makes it possible to increase the safety in remote traveling.

3. Meander Traveling Suppression Method According to Second Embodiment

Next, the meander traveling suppression method according to the second embodiment of the present disclosure will be described with reference to FIGS. 9 and 10. In meander traveling suppression method according to the first embodiment, when the vehicle 20 at the time of remote traveling is in the meandering state, the meander prevention processing is executed to suppress the meandering state of the vehicle 20. In the meander traveling suppression method according to the second embodiment, the presence or absence of execution of the meander prevention processing is determined in accordance with the presence or absence of detection of a following vehicle of the vehicle 20.

Figure 9:
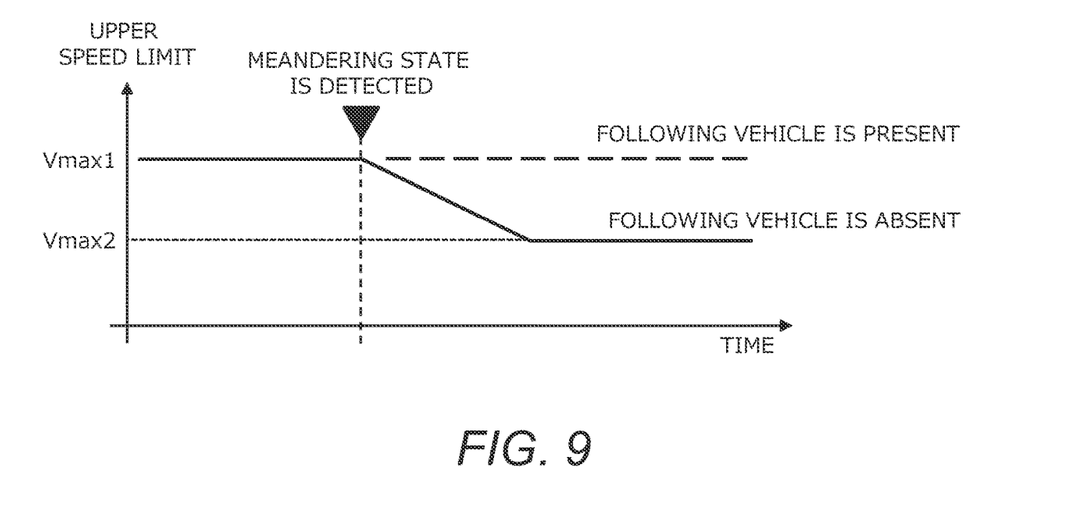
FIG. 9 is a diagram for explaining an example of a method of limiting the upper speed limit of the vehicle in the meander prevention processing according to a second embodiment of the present disclosure.
Figure 10:
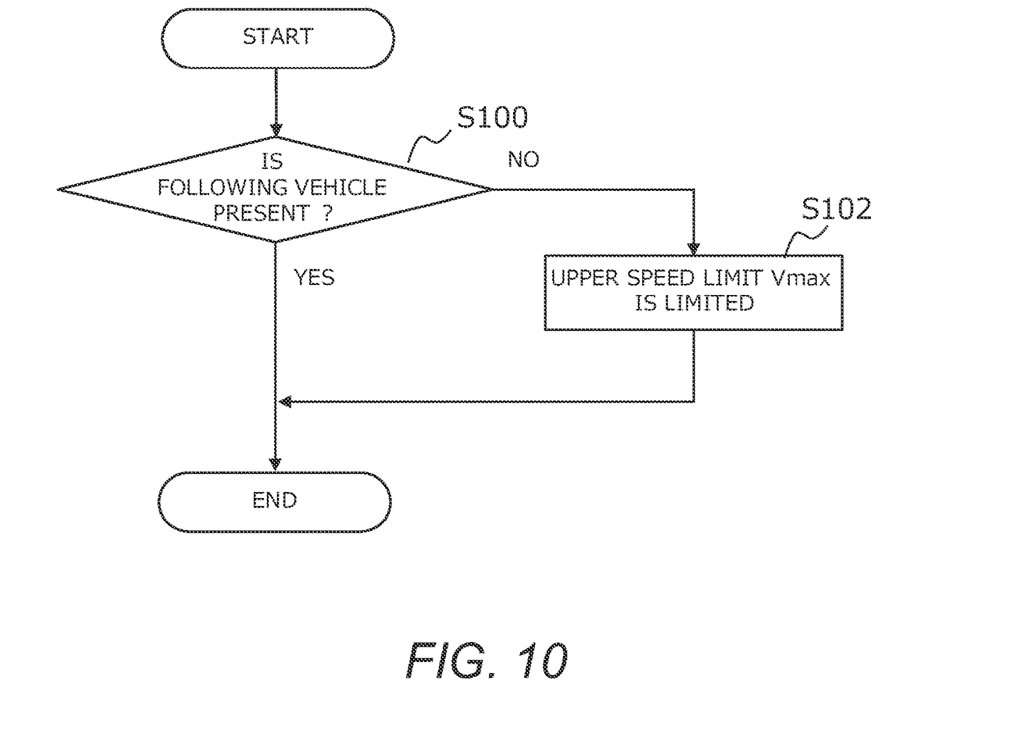
FIG. 10 is a flowchart for explaining the flow of the meandering prevention processing according to the second embodiment of the present disclosure.

FIG. 9 is a diagram for explaining an example of a method of limiting the upper speed limit of the vehicle in the meander prevention processing according to the second embodiment. FIG. 10 is a flowchart for explaining the flow of the meander prevention processing according to the second embodiment. The routine of the flowchart shown in FIG. 10 is executed when the meander traveling of the vehicle 20 in the meander detection processing is detected. In step S100 of the routine of FIG. 10, the meander prevention unit 214 determines whether a following vehicle of the vehicle 20 is present based on the external information EXT. The external sensor 22 includes a back monitor for imaging the rear of the vehicle 20. The meander prevention unit 214 applies a known image recognizing technique to an image acquired by the back monitor to detect the presence or absence of the following vehicles included in a predetermined TTC (Time-To-Collision) range. As a result, when the following vehicle of the vehicle 20 is detected, if the upper speed limit Vmax of the vehicle 20 is lowered, traffic obstruction and safety problems of the following vehicle may occur. Therefore, the meander prevention unit 214 holds execution of the upper speed limit setting processing, maintains the upper speed limit Vmax of the vehicle 20 at the first upper speed limit Vmax1, and ends the present routine. On the other hand, when the following vehicle of the vehicle 20 is not detected, the process proceeds to step S102. In step S102, the meander prevention unit 214 limits the upper speed limit Vmax of the vehicle 20 from the first upper speed limit Vmax1 to the second upper speed limit Vmax2 (<Vmax1), by executing the upper speed limit setting processing. The method of limiting the upper speed limit Vmax in the upper speed limit setting processing is the same as the method of the first embodiment.

According to the meander prevention processing of the second embodiment as described above, it is possible to suppress the meander traveling of the vehicle 20 while ensuring the safety of the following vehicle of the vehicle 20.

4. Meander Traveling Suppression Method According to Third Embodiment

Next, the meander traveling suppression method according to a third embodiment of the present disclosure will be described with reference to FIGS. 11 and 12. In the meander traveling suppression method according to the second embodiment, when the vehicle 20 during remote traveling is in the meandering state, the execution timing of the meander prevention processing for suppressing the meandering state of the vehicle 20 is adjusted in accordance with the presence or absence of a following vehicle. In the meander traveling suppression method according to the third embodiment, the degree of limitation of the meander prevention processing is adjusted according to the presence or absence of the following vehicle of the vehicle 20.

Figure 11:
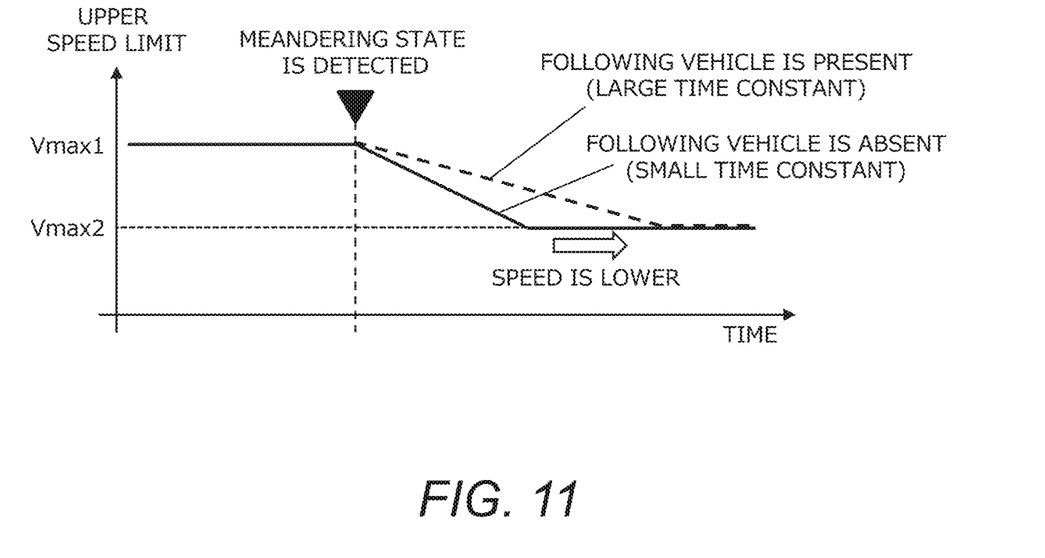
FIG. 11 is a diagram for explaining an example of a method of limiting the upper speed limit of the vehicle in the meander prevention processing according to a third embodiment of the present disclosure.
Figure 12:
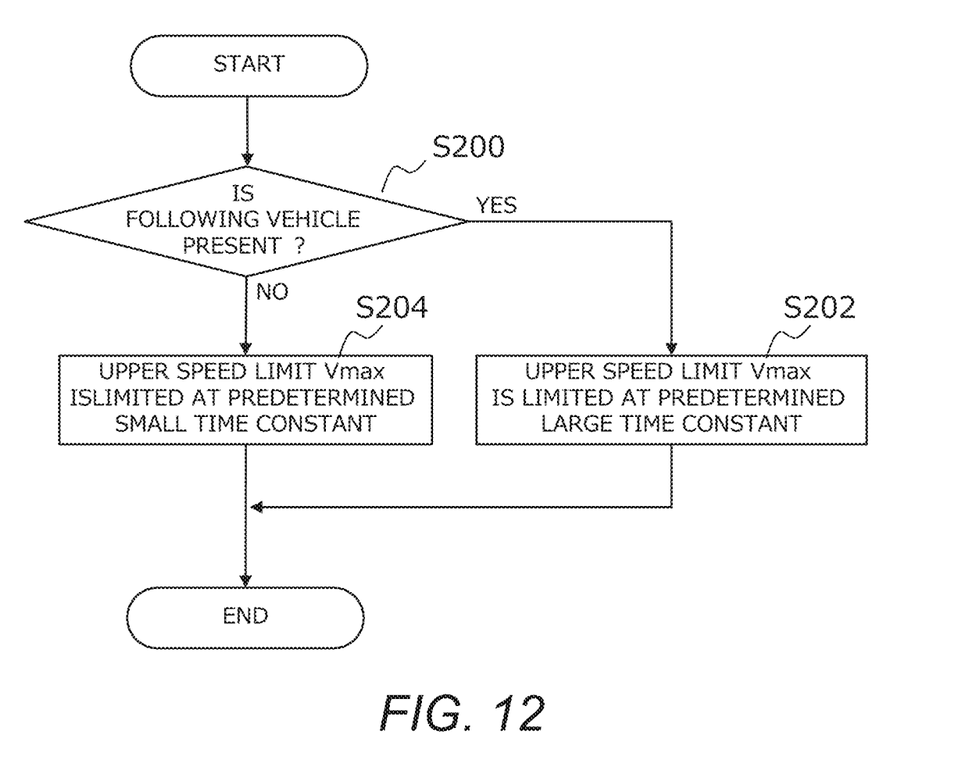
FIG. 12 is a flowchart for explaining the flow of the meander prevention processing according to the third embodiment of the present disclosure.

FIG. 11 is a diagram for explaining an example of a method of limiting the upper speed limit of the vehicle in the meander prevention processing according to the third embodiment. FIG. 12 is a flowchart for explaining the flow of the meander prevention processing according to the third embodiment. The routine of the flowchart shown in FIG. 12 is executed when the meander traveling of the vehicle 20 in the meander detection processing is detected. In step S200 of the routine of FIG. 12, meander prevention unit 214 determines whether a following vehicle is present in the vehicle 20 based on the external information EXT. Here, the meander prevention unit 214 executes the same processing as the processing of the above-described step S100. As a result, when the following vehicle of the vehicle 20 is not detected, the process proceeds to step S204, and when the following vehicle of the vehicle 20 is detected, the process proceeds to step S202.

In step S202, the meander prevention unit 214 changes the upper speed limit Vmax of the vehicle 20 from the first upper speed limit Vmax1 to the second upper speed limit Vmax2 (<Vmax1) at a predetermined large time constant so that it gradually becomes the second upper speed limit Vmax2 over a predetermined time. On the other hand, in the step S204, the meander prevention unit 214 changes the upper speed limit Vmax of the vehicle 20 at a predetermined small time constant smaller than the large time constant from the first upper speed limit Vmax1 to the second upper speed limit Vmax2 (<Vmax1). This means that the speed at which the vehicle speed changes from the first upper speed limit Vmax1 to the second upper speed limit Vmax2 is lower when a following vehicle of the vehicle 20 is detected than when the following vehicle is not detected. As a result, it is possible to suppress the meander traveling of the vehicle 20 while ensuring the safety of the following vehicle of the vehicle 20.

5. Meander Traveling Suppression Method According to Fourth Embodiment

Next, the meander traveling suppression method according to the fourth embodiment of the present disclosure will be described with reference to FIGS. 13 and 14. In meander traveling suppression method according to the first embodiment, when the vehicle 20 at the time of remote traveling is in the meandering state, the meander prevention processing is executed to suppress the meandering state of the vehicle 20. In the meander traveling suppression method according to the fourth embodiment, it is determined whether the meander prevention processing is executed in accordance with whether there is a possibility of lane departure of the vehicle 20.

Figure 13:
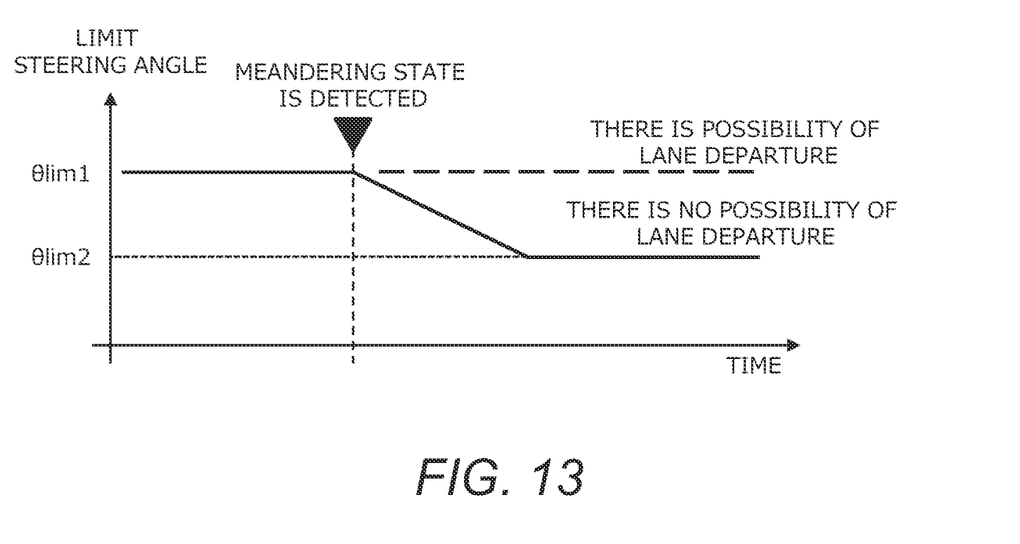
FIG. 13 is a diagram for explaining an example of a method of limiting a limit steering angle of the vehicle in the meander prevention processing according to a fourth embodiment of the present disclosure.
Figure 14:
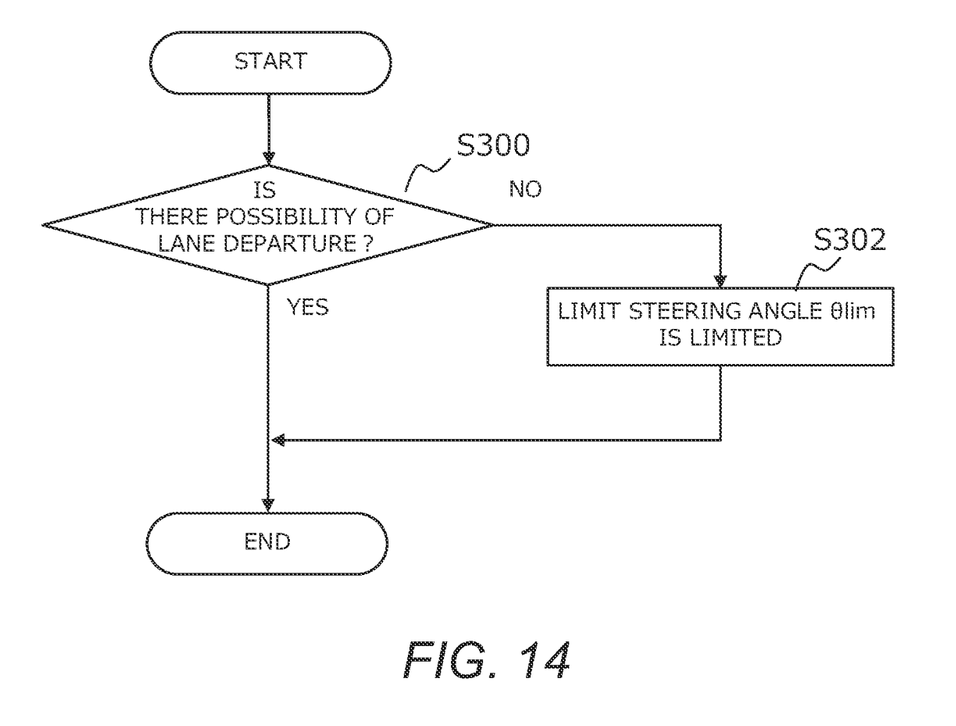
FIG. 14 is a flowchart for explaining the flow of the meander prevention processing according to the fourth embodiment of the present disclosure.

FIG. 13 is a diagram for explaining an example of a method for limiting a limit steering angle of a vehicle in the meander prevention processing according to the fourth embodiment. FIG. 14 is a flowchart for explaining the flow of the meander prevention processing according to the fourth embodiment. The routine of the flowchart shown in FIG. 14 is executed when the meander traveling of the vehicle 20 in the meander detection processing is detected. In step S300 of the routine of FIG. 14, the meander prevention unit 214 determines whether there is a possibility of a lane departure of the vehicle 20 based on the driving environmental information DINF. Here, the meander prevention unit 214 can use a known lane departure detecting technique used for a lane departure alert (Lane Departure Alert).

When it is determined that there is a possibility of a lane departure of the vehicle 20 as a result of the determination of step S300, it can be determined that there is a possibility that the vehicle 20 may hinder the steering for returning to the lane by further limiting the limit steering angle θlim. Therefore, when it is determined that there is a possibility of lane departure of the vehicle 20, the meander prevention unit 214 holds execution of the limit steering angle setting processing and maintains the limit steering angle θlim of the vehicle 20 at the first limit steering angle θlim1 to terminate this routine. On the other hand, when it is determined that there is no possibility of a lane departure of the vehicle 20, the process proceeds to step S302. In the step S302, the meander prevention unit 214 limits the limit steering angle θlim of the vehicle 20 from the first limit steering angle θlim1 to the second limit steering angle θlim2 (<θlim1) by executing the limit steering angle setting processing. The limiting method of the limit steering angle θlim in the limit steering angle setting processing is the same as that of the first embodiment.

According to the meander prevention processing of the fourth embodiment as described above, it is possible to suppress the meander traveling of the vehicle 20 while ensuring the safety of the vehicle 20.

6. Other Embodiments

Figure 15:
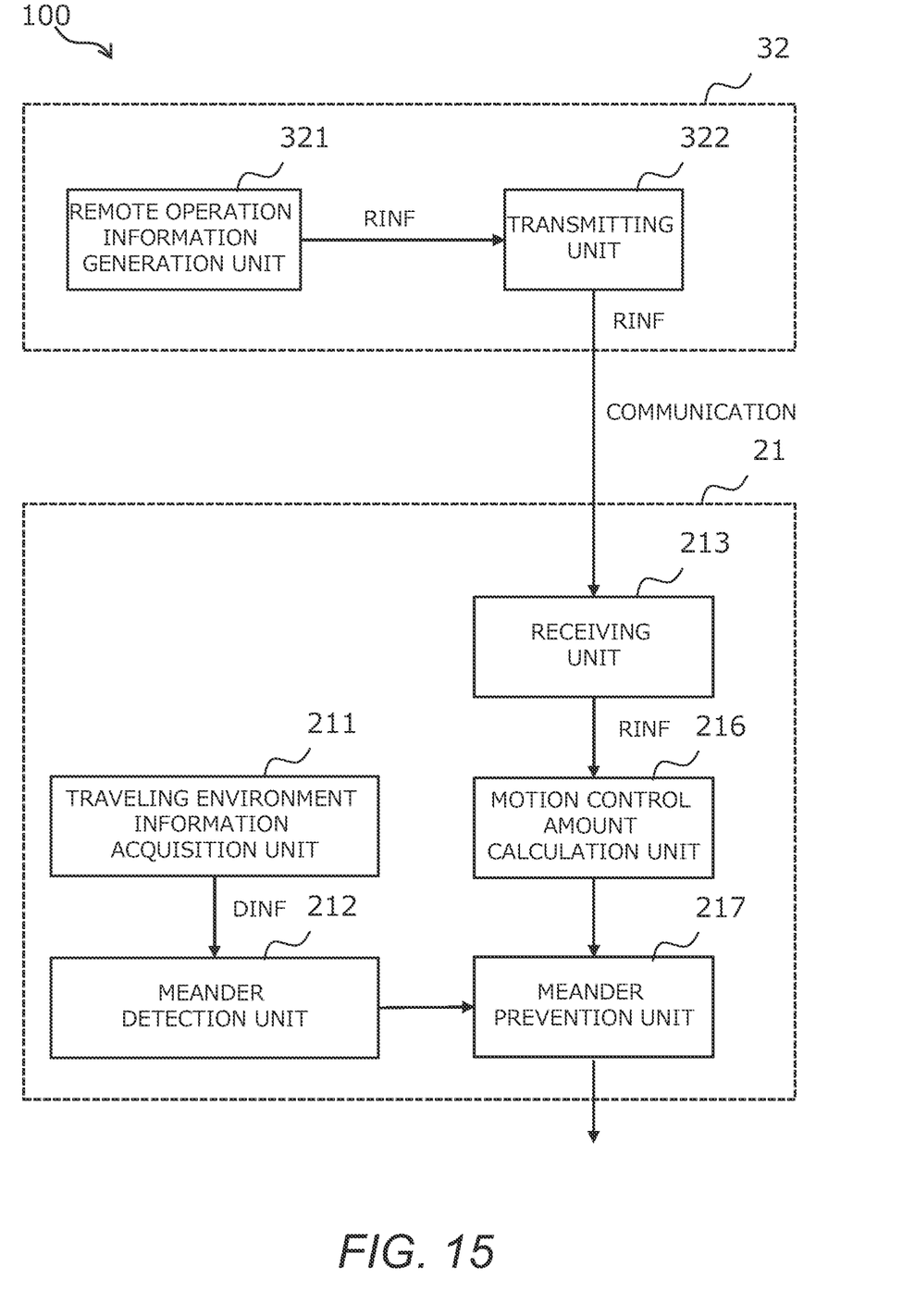
FIG. 15 is a functional block diagram showing a modification of the remote traveling system of the present disclosure.

The meander prevention processing may be configured to provide a limit on the motion control amount calculated by the motion control amount calculation unit 215. FIG. 15 is a functional block diagram showing a modification of the remote traveling system 100. In the modification shown in FIG. 15, the remote-control information RINF received by the receiving unit 213 is sent to the motion control amount calculation unit 216. The motion control amount calculation unit 216 calculates the motion control amount of the vehicle 20 based on the remote-control information RINF. The calculated motion control amount is sent to the meander prevention unit 217.

The meander prevention unit 217 executes the meander prevention processing when the meandering state information indicating that the meandering state has been detected in the meander detection processing is sent from the meander detection unit 212. In the meander prevention processing, the meander prevention unit 214 adds a limit for suppressing the meandering state of the vehicle 20 with respect to the motion control amount. Such processing also makes it possible to suppress the meander traveling of the vehicle 20 while ensuring the safety of the vehicle 20.

What is claimed is:

1. A remote traveling vehicle operated remotely by a remote operator, the remote traveling vehicle comprising:
at least one memory storing at least one program; and
at least one processor coupled with the at least one memory,
wherein the at least one program is configured to cause the at least one processor to execute:
receiving remote control information of a remote operator from a server via a communication network;
acquiring driving environment information of the remote traveling vehicle;
acquiring meandering state information including whether a meandering state of the remote traveling vehicle is detected according to a position of the remote traveling vehicle relative to a line on a road, based on the driving environment information; and
adding an adjustment for preventing a meandering state to motion control amount calculated from the remote operation information or the remote operation information, when the meandering state information includes detection of a meandering state of the remote traveling vehicle.

2. The remote traveling vehicle according to claim 1, wherein the driving environment information includes vehicle behavior information relating to vehicle behavior of the remote traveling vehicle.

3. The remote traveling vehicle according to claim 1, wherein when the meandering state is detected, the adding the adjustment includes:
executing an upper speed limit setting processing for setting an upper speed limit of the vehicle speed to a small value than before the meandering state is detected; and
executing an adjustment processing for adjusting the remote-control information or the motion control amount such that the vehicle speed does not exceed the upper speed limit.

4. The remote traveling vehicle according to claim 3, wherein the upper speed limit setting processing is configured to set such that the upper speed limit gradually decreases from a first upper speed limit toward a second upper speed limit.

5. The remote traveling vehicle according to claim 3, wherein when the meandering state is detected, the adding the adjustment includes:
acquiring whether a following vehicle of the remote traveling vehicle is detected; and
when the following vehicle is detected, holding execution of the upper speed limit setting processing.

6. The remote traveling vehicle according to claim 4, wherein when the meandering state is detected, the adding the adjustment includes:
acquiring whether a following vehicle of the remote traveling vehicle is detected; and
when the following vehicle is detected, in the upper speed limit setting processing, setting a time constant for changing the upper speed limit from the first upper speed limit to the second upper speed limit to a large value than when the following vehicle is not detected.

7. The remote traveling vehicle according to claim 1, wherein when the meandering state is detected, the adding the adjustment includes:
executing a limit steering angle setting processing for setting a limit steering angle of a vehicle steering angle to a small value than before the meandering state is detected; and
executing an adjustment processing for adjusting the remote-control information or the motion control amount such that the vehicle steering angle does not exceed the limit steering angle.

8. The remote traveling vehicle according to claim 7, wherein the limit steering angle setting processing is configured to set such that the limit steering angle gradually decreases from a first limit steering angle toward a second limit steering angle.

9. A remote traveling system comprising a remote traveling vehicle, and a server for performing remote traveling of the remote traveling vehicle,
wherein the server is configured to execute:
acquiring remote control information by a remote operator who drives the remote-control vehicle, and
transmitting the remote-control information to the remote traveling vehicle over a communication network, and
wherein the remote traveling vehicle comprises:
at least one memory storing at least one program; and
at least one processor coupled with the at least one memory,
wherein the at least one program is configured to cause the at least one processor to execute:
receiving the remote-control information from the server via the communication network;
acquiring driving environment information of the remote traveling vehicle;
acquiring meandering state information including whether a meandering state of the remote traveling vehicle is detected according to a position of the remote traveling vehicle relative to a line on a road, based on the driving environment information; and
adding an adjustment for preventing a meandering state to motion control amount calculated from the remote operation information or the remote operation information, when the meandering state information includes detection of a meandering state of the remote traveling vehicle.

10. A meander traveling suppression method for a computer to cause a remote traveling vehicle that remotely operates by a remote operator to suppress the meander traveling of the remote traveling vehicle,
wherein the computer is configured to execute:
receiving remote control information of a remote operator;
acquiring driving environment information of the remote traveling vehicle;
acquiring meandering state information including whether a meandering state of the remote traveling vehicle is detected according to a position of the remote traveling vehicle relative to a line on a road, based on the driving environment information; and
adding an adjustment for preventing a meandering state to motion control amount calculated from the remote operation information or the remote operation information, when the meandering state information includes detection of a meandering state of the remote traveling vehicle.

* * * * *